United States Patent
Hobo et al.

(10) Patent No.: US 12,487,298 B2
(45) Date of Patent: Dec. 2, 2025

(54) MAS APPARATUS

(71) Applicant: JEOL Ltd., Tokyo (JP)

(72) Inventors: Fumio Hobo, Tokyo (JP); Yusuke Tanimoto, Tokyo (JP); Yuki Endo, Tokyo (JP); Hiroki Takahashi, Tokyo (JP)

(73) Assignee: JEOL Ltd., Tokyo (JP)

( * ) Notice: Subject to any disclaimer, the term of this patent is extended or adjusted under 35 U.S.C. 154(b) by 171 days.

(21) Appl. No.: 18/387,231

(22) Filed: Nov. 6, 2023

(65) Prior Publication Data

US 2024/0151789 A1    May 9, 2024

(30) Foreign Application Priority Data

Nov. 8, 2022   (JP) ................. 2022-178674

(51) Int. Cl.
*G01R 33/31*   (2006.01)
*G01R 33/30*   (2006.01)

(52) U.S. Cl.
CPC ........... *G01R 33/307* (2013.01); *G01R 33/31* (2013.01)

(58) Field of Classification Search
CPC .. G01R 33/307; G01R 33/00; G01R 33/0035; G01R 33/0358; G01R 33/0356; G01R 33/3852; G01R 33/1276; G01R 33/383; G06F 3/017; G06F 3/0346; G06F 3/012; H01L 39/223
See application file for complete search history.

(56) References Cited

U.S. PATENT DOCUMENTS

| | | | |
|---|---|---|---|
| 4,940,942 A | 7/1990 | Bartuska et al. | |
| 9,194,920 B2 | 11/2015 | Hu et al. | |
| 9,366,736 B2* | 6/2016 | Cho .................... | G01R 33/307 |
| 2014/0099730 A1* | 4/2014 | Hu ....................... | G01R 33/307 |
| | | | 422/68.1 |
| 2014/0139220 A1* | 5/2014 | Hoyt .................... | G01R 33/307 |
| | | | 324/321 |
| 2014/0167756 A1* | 6/2014 | Cho ....................... | G01R 33/30 |
| | | | 324/309 |
| 2017/0146621 A1 | 5/2017 | Freytag et al. | |

FOREIGN PATENT DOCUMENTS

JP    2009092424 A    4/2009

OTHER PUBLICATIONS

Extended European Search Report issued in EP23207310.6 on Apr. 5, 2024.

* cited by examiner

*Primary Examiner* — Lee E Rodak
*Assistant Examiner* — Taqi R Nasir
(74) *Attorney, Agent, or Firm* — The Webb Law Firm

(57) ABSTRACT

An angle adjustment mechanism has a block, a projecting piece, and a connection mechanism. The projecting piece is fixed to a stator. The connection mechanism has elongated holes provided in the block and a shaft member provided in the projecting piece. The shaft member is inserted in the elongated holes. During a tilt angle adjustment process, the shaft member is caused to move in a sliding motion in the elongated holes. During a cooling process, the shaft member is also caused to move in a sliding motion in the elongated holes.

8 Claims, 10 Drawing Sheets

MAS APPARATUS

CROSS REFERENCE TO RELATED APPLICATION

This application claims priority to Japanese Patent Application No. 2022-178674 filed Nov. 8, 2022, the disclosure of which is hereby incorporated by reference in its entirety.

BACKGROUND OF THE DISCLOSURE

Field of the Disclosure

The present disclosure relates to a magic angle spinning (MAS) apparatus, and in particular to adjustment of the tilt angle of a stator thereof.

Description of Related Art

To perform a nuclear magnetic resonance (NMR) measurement on a solid sample, an NMR measurement probe equipped with a MAS apparatus is used as necessary. The MAS apparatus is a module that causes a sample tube containing the solid sample to move in a rotational motion while maintaining the tilt angle of the sample tube at a predetermined angle. The predetermined angle is an angle with respect to the static magnetic field direction, which is referred to as the magic angle. Specifically, the predetermined angle is 54.7 degrees.

The MAS apparatus typically has a stator that rotates the sample tube, a structure that supports the stator, an angle adjustment mechanism, and the like. The stator has a plurality of gas bearings, a drive gas injection unit, and the like. The sample tube is a rotor with respect to the stator. The angle adjustment mechanism is a mechanism for fine-tuning of the tilt angle of the central axis of rotation of the sample tube.

In the NMR measurement probe, the angle adjustment mechanism is connected to a rod-shaped operating member. The angle adjustment mechanism is operated by operating the operating member to thereby change the tilt angle of the central axis of rotation of the sample tube. JP 2009-092424 A and U.S. Pat. No. 9,194,920 B disclose a MAS apparatus equipped with an angle adjustment mechanism. Neither of these documents discloses an angle adjustment mechanism that allows for thermal contraction of parts that occurs during a cooling process.

SUMMARY OF THE DISCLOSURE

Cooling of the MAS apparatus in the NMR probe is carried out when it is desired to perform the NMR measurement while keeping an electronic circuit (particularly, an NMR detection coil) in the NMR probe or a sample in the sample tube at a low temperature. During the process of cooling the MAS apparatus, typically, thermal contraction of parts constituting the MAS apparatus occurs. If the angle adjustment mechanism of the MAS apparatus is not sufficiently adapted to be cooled, the angle adjustment mechanism will not work, or will not work properly when it is cooled.

An object of the present disclosure is to provide a MAS apparatus that can perform angle adjustment properly even when it is cooled. Alternatively, an object of the present disclosure is to provide an angle adjustment mechanism that allows for changes in the shapes of parts that occur in the course of temperature change.

A MAS apparatus according to the present disclosure includes a stator that causes a sample tube to move in a rotational motion, a structure that rotatably supports the stator around a tilt axis parallel to the horizontal direction, and an angle adjustment mechanism that adjusts the tilt angle of the stator, and in this apparatus, the angle adjustment mechanism includes a first movable part that is caused to move vertically in a linear motion by an external operating force, a second movable part that is fixed to the stator and is caused to move in an arc motion around the tilt axis, and a connection mechanism that is provided across the first movable part and the second movable part. In this apparatus, the connection mechanism includes an elongated hole that is provided in one of the first movable part and the second movable part, and a shaft member that is provided in the other one of the first movable part and the second movable part and has a shape extending in the horizontal direction, the shaft member being inserted in the elongated hole. During a process of adjusting the tilt angle of the stator, the connection mechanism converts the linear motion of the first movable part into the arc motion of the second movable part, and at this time, the shaft member is caused to move in a sliding motion against the elongated hole, and when a positional relationship between the elongated hole and the shaft member changes due to thermal contraction of the MAS apparatus during a process of cooling the MAS apparatus, the shaft member is caused to move in a sliding motion against the elongated hole.

BRIEF DESCRIPTION OF THE DRAWINGS

Embodiments of the present disclosure will be described based on the following figures, wherein.

DESCRIPTION OF NON-LIMITING EMBODIMENTS OF THE DISCLOSURE

Figure 1:
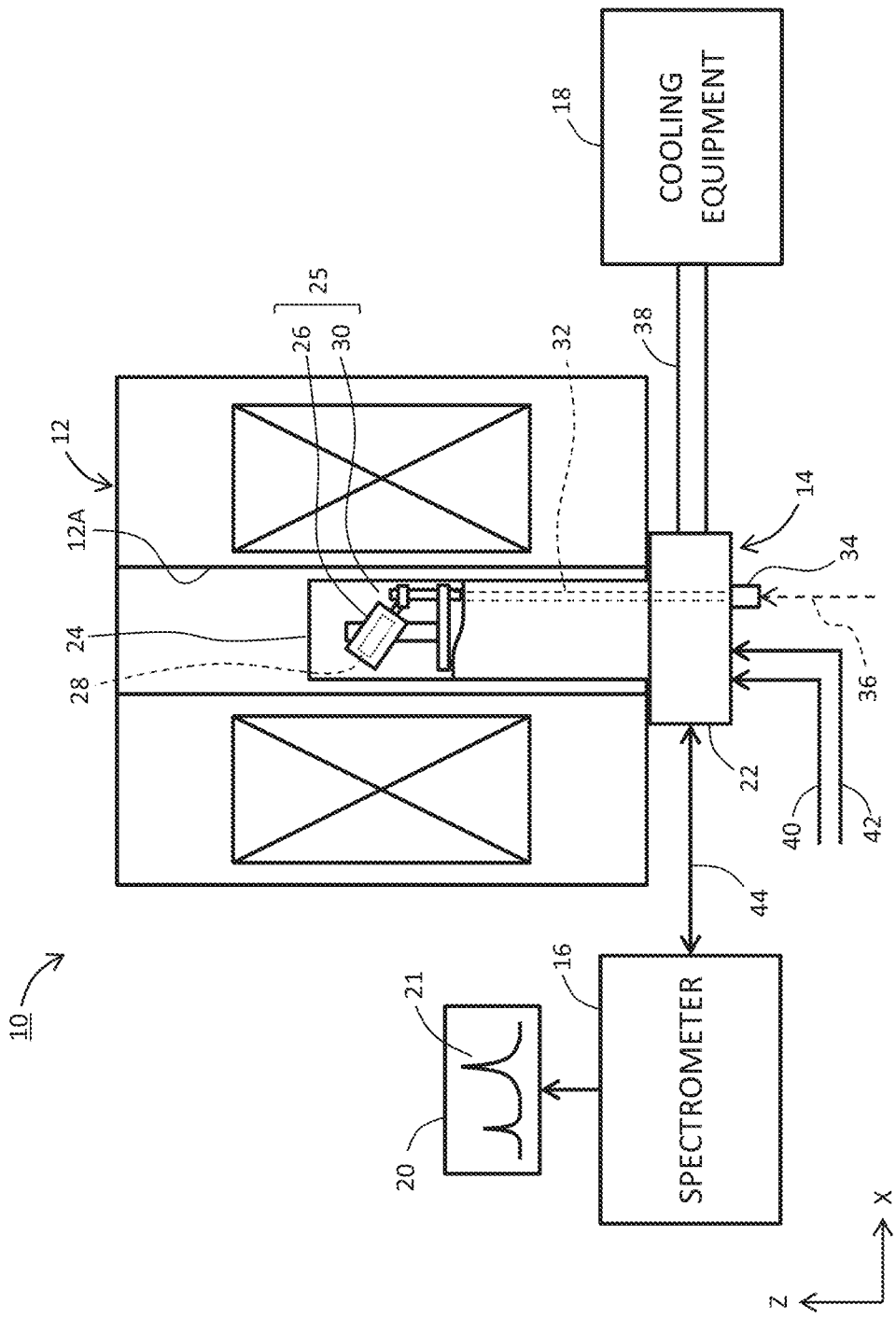
FIG. 1 is a schematic view showing an NMR measurement system according to an embodiment.

Hereinafter, embodiments will be described with reference to the drawings.

(1) Summary of Embodiments

A MAS apparatus according to an embodiment has a stator, structure, and angle adjustment mechanism. The stator causes a sample tube to move in a rotational motion. The structure rotatably supports the stator around the tilt axis of the stator. The angle adjustment mechanism is a mechanism for adjusting the tilt angle of the stator. The angle adjustment mechanism has a first movable part, a second movable part, and a connection mechanism. The first movable part is caused to move vertically in a linear motion by an external operating force. The second movable part is a part that is fixed to the stator and is caused to move in an arc motion around the tilt axis. The connection mechanism is provided across the first movable part and the second movable part. Specifically, the connection mechanism has an elongated hole provided in one of the first movable part and the second movable part, and a shaft member provided in the other one of the first movable part and the second movable part. The shaft member has a shape extending in the horizontal direction and is inserted in the elongated hole. During the process of adjusting the tilt angle of the stator, the connection mechanism converts the linear motion of the first movable part into the arc motion of the second movable part, and at this time, the shaft member is caused to move in a sliding motion against the elongated hole. Further, when the positional relationship between the elongated hole and the shaft member changes due to thermal contraction of the MAS apparatus during the process of cooling the MAS apparatus, the shaft member is caused to move in a sliding motion against the elongated hole.

The above configuration allows for the sliding motion of the shaft member in the elongated hole during the angle adjustment process, and this can prevent excessive stress on any portions in the angle adjustment mechanism. The tilt angle can thus be adjusted smoothly. In addition, the sliding motion of the shaft member is allowed in the elongated hole during the process of cooling the MAS apparatus, and this can prevent excessive stress on any portions in the angle adjustment mechanism due to thermal contraction of the MAS apparatus. It is thus possible to prevent malfunction of the angle adjustment mechanism when it is cooled.

As such, the angle adjustment mechanism according to the embodiment includes the connection mechanism that allows for a first sliding motion generated when the tilt angle is adjusted, and a second sliding motion generated when thermal contraction occurs. The temperature obtained after the cooling process (cooled temperature) is, for example, within the range of 10K to 273K, or within the range of 10K to 100K. The first movable part corresponds to a block (described below). The second movable part corresponds to a projecting piece (described below). The elongated hole has one or two horizontally oriented openings. The elongated hole is a through hole or a non-through hole. The shaft member is a rod-shaped or cylindrical member extending in the horizontal direction. In the embodiment, the vertical direction and the horizontal direction indicate two directions that are orthogonal to each other. The vertical direction is the static magnetic field direction, and the horizontal direction is a direction orthogonal to the static magnetic field direction.

The MAS apparatus according to the embodiment is positioned in the NMR measurement probe. The sample tube is positioned in the stator either before the MAS apparatus is positioned in the probe or after the MAS apparatus is positioned in the probe. The sample tube is positioned in the stator manually or automatically.

In an embodiment, the shaft member has a body inserted in the elongated hole. The size of the short axis of the elongated hole matches the diameter of the body. The size of the long axis of the elongated hole defines the maximum sliding range of the shaft member. In the embodiment, when viewed in the horizontal direction, the elongated hole is composed of a rectangular region extending in the long axis direction, and two semicircular regions connected to respective ends of the rectangular region. The radius of curvature of the semicircular regions is approximately equal to the radius of the body of the shaft member.

In the embodiment, the elongated hole is provided in the first movable part, and the shaft member is provided in the second movable part. The long axis of the elongated hole intersects the arc motion path of the second movable part. The shaft member may be provided in the first movable part, and the elongated hole may be provided in the second movable part.

In an embodiment, the stator has an upper end portion and a lower end portion spaced apart in the direction of the central axis of the stator. The second movable part protrudes from the lower end portion along the direction of the central axis of the stator. This configuration makes it possible to dispose the second movable part away from the tilt axis, and thus, it becomes easy to perform fine tuning of the tilt angle. It is also possible to reduce the operating force transmission distance when a configuration that transmits the operating force from the lower side of the MAS apparatus to the MAS apparatus is adopted.

In an embodiment, one of the movable parts has a first side surface and a second side surface. The other one of the movable parts contacts the first side surface. The shaft member has a body that protrudes from the other one of the movable parts and is inserted in the elongated hole, and an enlarged end portion that is provided at a tip of the body and is hooked on the second side surface. This configuration allows the second movable part and the enlarged end portion to restrict a horizontal rotational motion of the first movable part.

In an embodiment, the body of the shaft member has a horizontal screw hole. A screw is inserted in the horizontal screw hole. The enlarged end portion described above is a head portion of the screw inserted in the screw hole. This configuration facilitates assembly and disassembly of the connection mechanism.

In an embodiment, the first movable part has a female thread that is a through hole. The angle adjustment mechanism further includes a rod that transmits the operating force and has a rod end portion having a male thread to be inserted in the female thread. The first movable part and the rod end portion are made of the same material. This configuration allows the first movable part and the rod end portion to have the same degree of thermal contraction or degrees of thermal contraction that are close to each other during the cooling process. It is therefore possible to avoid a tight coupling between the female thread and the male thread when they are cooled.

In an embodiment, the structure includes a pair of posts that rotatably support the stator around the tilt axis. The pair of posts include a pair of bearings that hold a pair of rotating shaft members fixed to the stator. During the cooling process described above, the degree of thermal contraction of a material constituting the pair of bearings is greater than that of a material constituting the pair of rotating shaft members. This configuration makes it possible to eliminate or reduce leakage from between the pair of rotating shaft members and the pair of bearings when they are cooled.

In an embodiment, the pair of posts described above have a pair of first gas passages. The pair of rotating shaft members described above have a pair of second gas passages. Cooled gas is supplied to the inside of the stator through the pair of first gas passages and the pair of second gas passages. The gas supply cools the MAS apparatus. In the embodiment, the gas serves as a cold transfer medium and also serves as bearing gas and drive gas.

(2) Details of Embodiments

FIG. 1 shows an NMR measurement system 10 according to an embodiment. The NMR measurement system 10 analyzes a sample by observing NMR produced in the sample. The sample is a solid sample in the embodiment. For example, the solid sample includes powder. The NMR measurement system 10 has a static magnetic field generator 12, an NMR measurement probe 14, a spectrometer 16, cooling equipment 18, and the like. The spectrometer 16 is connected to a display device 20. The display device 20 shows an NMR spectrum on its screen. The spectrometer 16 has a transmission unit, a reception unit, a frequency analysis unit, and other units.

The static magnetic field generator 12 has superconducting coils that generate a static magnetic field. The static magnetic field is generated in the Z direction (vertical direction). The X direction orthogonal to the Z direction is a first horizontal direction. The Y direction orthogonal to the Z and X directions is a second horizontal direction. The static magnetic field generator 12 has a bore 12A as a vertical through hole.

The NMR measurement probe 14 is composed of a base unit 22 and an insertion unit 24. The base unit 22 is positioned under the static magnetic field generator 12. The insertion unit 24 is inserted in the bore 12A. A MAS apparatus 25 is positioned within an upper end portion of the insertion unit 24. The MAS apparatus 25 has a stator 26 and an angle adjustment mechanism 30.

The angle adjustment mechanism 30 is a fine-tuning mechanism for allowing the tilt angle of the stator 26 to coincide with the magic angle (specifically, 54.7 degrees with respect to the static magnetic field direction). The stator 26 has a sample tube 28 therein. The sample tube 28 contains the sample. Typically, the sample tube is positioned in the stator 26 before the NMR measurement probe 14 is attached to the static field generator 12. The sample tube may be transferred into the stator 26 using a sample tube transfer system after the NMR measurement probe 14 is attached to the static field generator 12.

The MAS apparatus is fed with bearing gas 40 and drive gas 42. The bearing gas 40 and the drive gas 42 may be the same gas. The bearing gas 40 and the drive gas 42 are, for example, cooled helium gas, cooled nitrogen gas, or the like.

A piping system 38 composed of a plurality of pipes is provided between the base unit 22 and the cooling equipment 18. Through the piping system 38, refrigerant is fed from the cooling equipment 18 to the NMR measurement probe 14. The refrigerant includes liquid helium, liquid hydrogen, liquid nitrogen, or the like. Helium gas, hydrogen gas, nitrogen gas, or the like may be used as the refrigerant. The MAS apparatus 25 may be cooled by the cooled bearing gas 40 and the cooled drive gas 42.

In the MAS apparatus 25, an NMR detection coil (not shown) is provided around the sample tube. An electronic circuit containing the NMR detection coil may also be cooled if necessary, and the sample may be cooled accordingly. A cable 44 for transmitting and receiving signals is provided between the base unit 22 and the spectrometer 16.

A rod 32 for transmitting an external operating force to the angle adjustment mechanism is positioned in the NMR measurement probe 14. The rod 32 has a knob 34 at its lower end portion. For example, after a required cooled state has been achieved, the tilt angle of the stator 26 is adjusted by turning the knob 34 while an NMR spectrum 21 generated in the NMR measurement of the sample is observed. The adjustment of the tilt angle may be automated as indicated by reference numeral 36. The sample tube may contain a sample used for adjusting the tilt angle.

Figure 2:
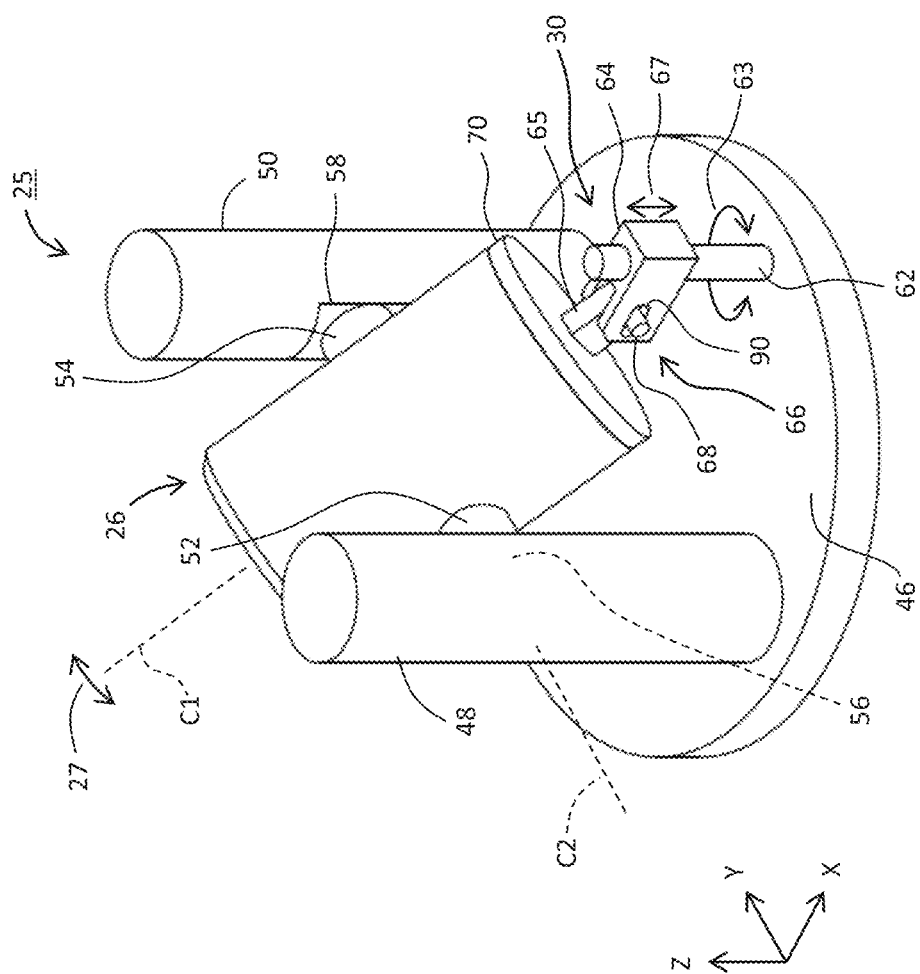
FIG. 2 is a perspective view showing a first example of a MAS apparatus.

FIGS. 2 to 5 show a first example of the MAS apparatus. In FIG. 2, the MAS apparatus has a base 46, a pair of posts 48 and 50, the stator 26, and the angle adjustment mechanism 30. As described above, the X direction is the first horizontal direction, and the Y direction is the second horizontal direction. The Z direction is the vertical direction. The base 46 and the pair of posts 48 and 50 constitute the structure.

The base 46 is a circular plate extending in the horizontal direction. The pair of posts 48 and 50 are installed on the base 46. The stator 26 has a pair of rotating shaft members 52 and 54 at its middle portion. The pair of posts 48 and 50 have a pair of bearings 56 and 58. The pair of rotating shaft members 52 and 54 are rotatably held by the pair of bearings 56 and 58.

C1 indicates the central axis of the stator 26. The central axis C1 is the central axis of rotation of the sample tube. The central axis C1 belongs to the XZ plane and is orthogonal to the Y direction. C2 indicates the tilt axis of the stator 26. The stator 26 is caused to move in a rotational motion (tilting motion) about the tilting axis C2. The central axis of the bearings 56 and 58 coincides with the tilt axis C2. The tilt axis C2 is orthogonal to the XZ plane and parallel to the Y direction.

The pair of posts 48 and 50 are hollow members (described below). The pair of rotating shaft members 52 and 54 are also hollow members (described below). During the tilting motion of the stator 26, slip occurs between the pair of rotating shaft members 52 and 54 and the pair of bearings 56 and 58.

The angle adjustment mechanism 30 has a rod 62, a block 64, and a projecting piece 65, and further has a connection mechanism 66 provided across the block 64 and the projecting piece 65. The connection mechanism 66 has elongated holes 90 provided in the block 64 and a shaft member 68 provided in the projecting piece 65. The block 64 is a first movable part, and the projecting piece 65 is a second movable part. The long axis of the elongated holes 90 belongs to the XZ plane, and it is parallel to the X direction in the example in FIG. 2. The central axis of the shaft member 68 is parallel to the Y direction.

As illustrated, the shaft member 68 is inserted in the elongated holes 90. When the elongated holes 90 are moved up and down, the shaft member 68 is moved up and down accordingly. Within the elongated hole 90, the shaft member 68 has a degree of freedom in its position in the X direction. Even if the positional relationship between the block 64 and the projecting piece 65 changes in the X direction, the change causes no excessive stress on the connection mechanism 66. The connection mechanism 66 has the functions of coupling the block 64 and the projecting piece 65 in the Z direction (and the Y direction), and allowing or absorbing changes in the positional relationship between the block 64 and the projecting piece 65 in the X direction.

Rotating the rod 62 (see reference numeral 63) causes the block 64 to move linearly in the vertical direction, or in the Z direction (see reference numeral 67). The connection mechanism 66 converts the linear motion of the block 64 into the arc motion of the projecting piece 65. This causes the stator 26 to move in a rotational motion about the tilt axis C2 (see reference numeral 27). The arc motion trajectory of the projecting piece 65 belongs to the XZ plane. As the connection mechanism 66 thus functions during the process of adjusting the tilt angle, no excessive stress is produced on any particular parts.

During the process of cooling the MAS apparatus 25, the posts 48 and 50 shrink. For example, the height of the posts 48 and 50 on the base 46 is reduced. In addition, the stator 26 also shrinks during the process of cooling the MAS apparatus. For example, both end portions of the stator 26 shrink toward the tilt axis C2. Likewise, the components of the angle adjustment mechanism 30 also shrink. The thermal shrinkage rate of each component depends on the shape and material of the component.

Due to thermal contraction during the process of cooling the MAS apparatus 25, the positional relationship between the block 64 and the projecting piece 65 changes in the X direction. The change is absorbed by the connection mechanism 66. This makes it possible to avoid concentration of stress on particular parts during the cooling process and ensure proper operation of the angle adjustment mechanism 30 after it is cooled.

As described above, the connection mechanism 66 allows for the first sliding motion of the shaft member 68 in the elongated holes 90 during the process of adjusting the tilt angle, and the second sliding motion of the shaft member 68 in the elongated holes 90 during the cooling process. The components of the angle adjustment mechanism may be made of resin, non-magnetic metal, magnetic susceptibility-corrected metal, or the like. When choosing resin, it is desirable to use one with excellent durability.

Figure 3:
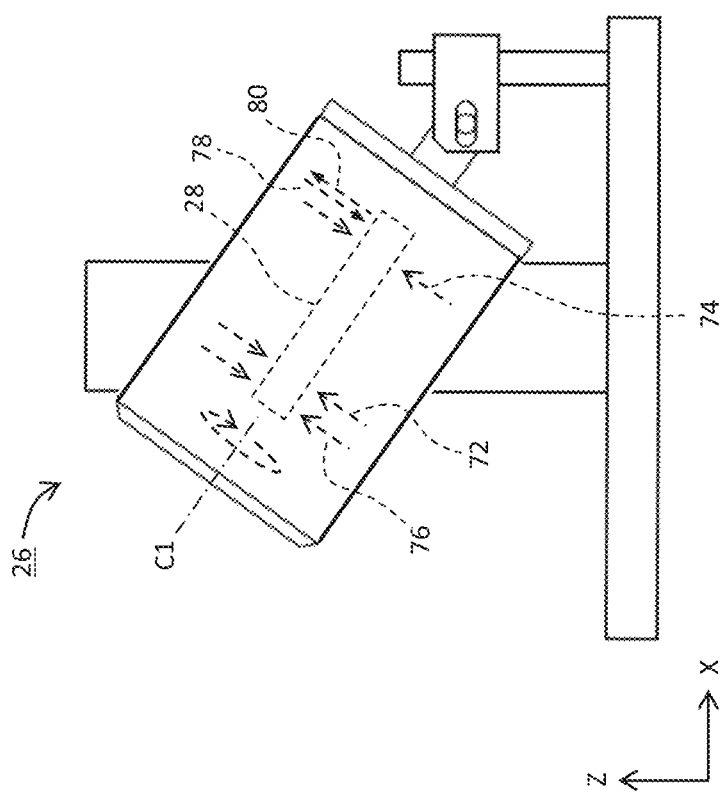
FIG. 3 is a side view showing a stator.

The stator 26 will be described with reference to FIG. 3. The stator 26 contains the sample tube 28 therein. The stator 26 has a first gas bearing, a second gas bearing, a drive gas injection unit, and the like.

The first gas bearing is for blowing bearing gas 72 to the sample tube 28 from around the sample tube 28. The second gas bearing is also for blowing bearing gas 74 to the sample tube 28 from around the sample tube 28. The drive gas injection unit injects drive gas 76 to a turbine blade train at an end portion of the sample tube 28, thereby causing the sample tube 28 to move in a high-speed rotational motion. To detect the rotational speed of the sample tube 28, a first optical fiber 78 for laser light irradiation and a second optical fiber 80 for detection of reflected light are provided.

Figure 4:
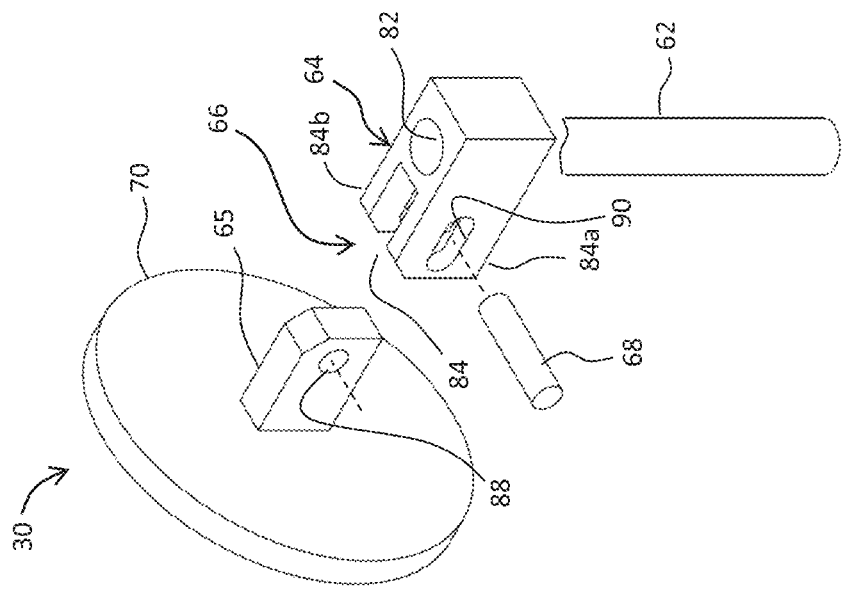
FIG. 4 is a perspective view showing a first example of an angle adjustment mechanism.

FIG. 4 illustrates the angle adjustment mechanism 30 according to the first example. The block 64 has a two-way portion 84, and the two-way portion 84 is composed of a first portion 84a and a second portion 84b. Each of the first portion 84a and the second portion 84b has the elongated hole 90. The block 64 has a female thread 82 that is a through hole therein. On the other hand, an upper end portion of the rod 62 constitutes a male thread. The male thread is inserted in the female thread 82, and the two are engaged with each other.

The stator has the projecting piece 65 on its back plate 70. In practice, the projecting piece 65 is integrally formed with the back plate 70. The projecting piece 65 extends in the direction of the central axis of the stator. The projecting piece 65 has a horizontal through hole 88 at its end portion. The shaft member 68 penetrates through a first elongated hole 90 in the first portion 84a, the horizontal through hole 88 in the projecting piece 65, and a second elongated hole 90 in the second portion 84b.

The shaft member 68 is fixed to the projecting piece 65. They may be integrally formed. The long axis of the elongated holes 90 is parallel to the first horizontal direction (X direction). In other words, the short axis of the elongated holes 90 is orthogonal to the first horizontal direction. The shaft member 68 is caused to move in a sliding motion inside the elongated holes 90.

The two elongated holes 90 and the shaft member 68 constitute the connection mechanism 66. The elongated hole may be provided in the projecting piece 65, and the shaft member may be provided in the block 64 (descried below). Even such a configuration allows for the above first and second sliding motions.

In an embodiment, a first material that constitutes the rod 62 on which the male thread is formed and the second material that constitutes the block 64 in which the female thread is formed are the same. By making the degree of thermal contraction of the first material during the cooling process the same as that of the second material, it is possible to avoid over-tightening of the male thread by the female thread when they are cooled. A material having a first thermal shrinkage rate may be adopted as the first material, and a material having a second thermal shrinkage rate smaller than the first thermal shrinkage rate may be adopted as the second material.

Figure 5:
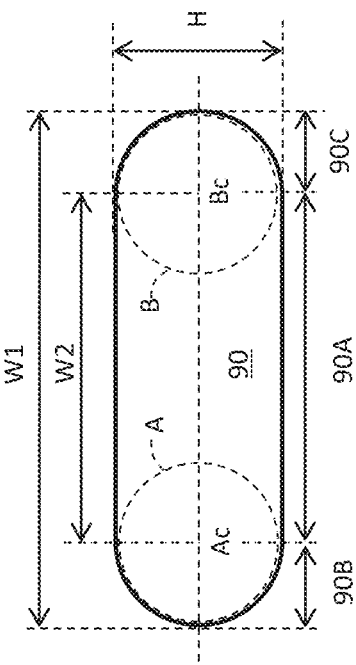
FIG. 5 is a view showing an elongated hole.

FIG. 5 shows the elongated hole 90 viewed in the horizontal direction. The right-and-left direction in FIG. 5 is the long axis direction of the elongated hole 90, and the up-and-down direction in FIG. 5 is the short axis direction of the elongated hole 90.

When viewed in the second horizontal direction (Y direction), the elongated hole 90 is composed of a rectangular region 90A, and two semicircular regions 90B and 90C connected to respective ends of the rectangular region 90A. The center of a shaft member A located at the left end in the sliding direction is indicated by Ac. The center of a shaft member B located at the right end in the sliding direction is indicated by Bc. The size W1 of the long axis of the elongated hole 90 defines the maximum sliding range W2 of the shaft member. The size H of the short axis of the elongated hole 90 matches the diameter of the shaft member. Specifically, the size H of the short axis is approximately equal to the diameter of the shaft member. The radius of curvature of the arc of the semicircular regions 90B and 90C is approximately equal to the radius of the shaft member.

It is desirable to determine the shape of the elongated hole and the diameter of the shaft member such that a sliding fit or a smooth fit is achieved between the elongated hole 90 and the shaft member in a low temperature state. For example, it is desirable to determine the maximum sliding range W2 such that the angle can be adjusted by the magic angle ±α degrees. The α is, for example, one degree, two degrees, or three degrees.

Figure 6:
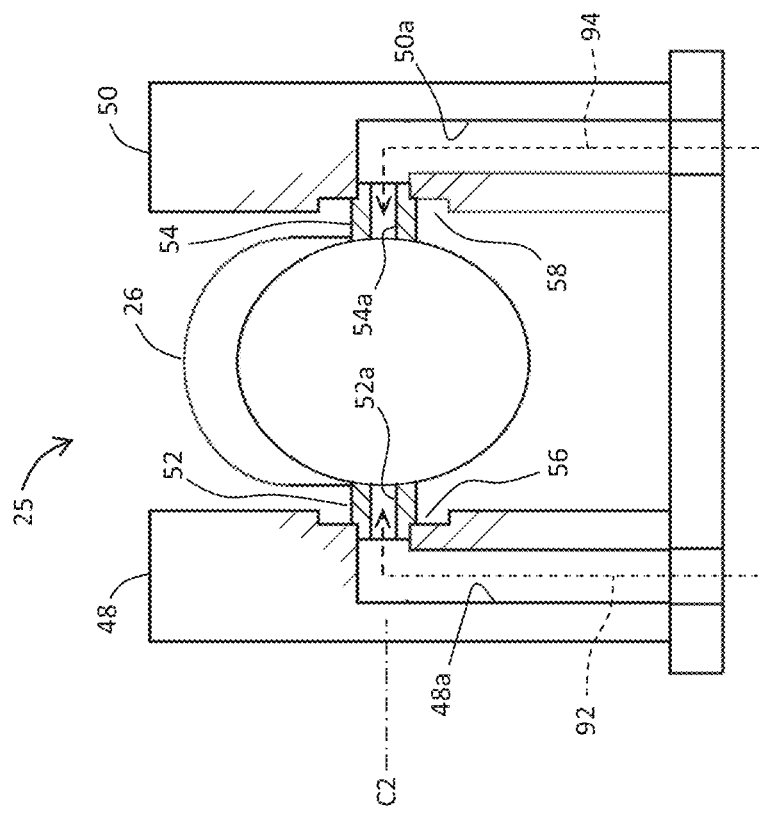
FIG. 6 is a cross-sectional view showing the MAS apparatus.

FIG. 6 shows a cross-section of the MAS apparatus. The posts 48 and 50 have gas passages 48a and 50a, respectively. In the posts 48 and 50, the areas near outlets of the gas passages 48a and 50a respectively serve as the bearings 56 and 58.

The rotating shaft members 52 and 54 are fixed to the stator 26. The rotating shaft members 52 and 54 have a cylindrical shape. The rotating shaft members 52 and 54 respectively have gas passages 52a and 54a. End portions of the rotating shaft members 52 and 54 are rotatably held by the bearings 56 and 58, respectively.

Cooled gas 92 is supplied to the inside of the stator 26 through the gas passage 48a and the gas passage 52a. Likewise, cooled gas 94 is supplied to the inside of the stator 26 through the gas passage 50a and the gas passage 54a.

The gas 92 and the gas 94 are the same cooling gas. For example, the gas 92 may be used as bearing gas, and the gas 94 may be used as drive gas. Alternatively, the gas 92 and the gas 94 may be respectively used as the drive gas and the bearing gas.

In the cooling process, the degree of thermal contraction of a third material constituting the bearings 56 and 58 is greater than that of a fourth material constituting the rotating shaft members 52 and 54. The third material and the fourth material are determined so that this relationship is established. In addition, a material having a smaller coefficient of friction is selected as the third material. The third material is, for example, fluororesin, and the fourth material is, for example, a nonmagnetic metal.

By adopting the above configuration, it is possible to improve the sealing performance between the bearings 56 and 58 and the rotating shaft members 52 and 54 when they are cooled. That is, it is possible to reduce gas leakage. In addition, the bearings 56 and 58 hold the rotating shaft members 52 and 54 such that the rotating shaft members 52 and 54 can slip even when they are cooled.

Figure 7:
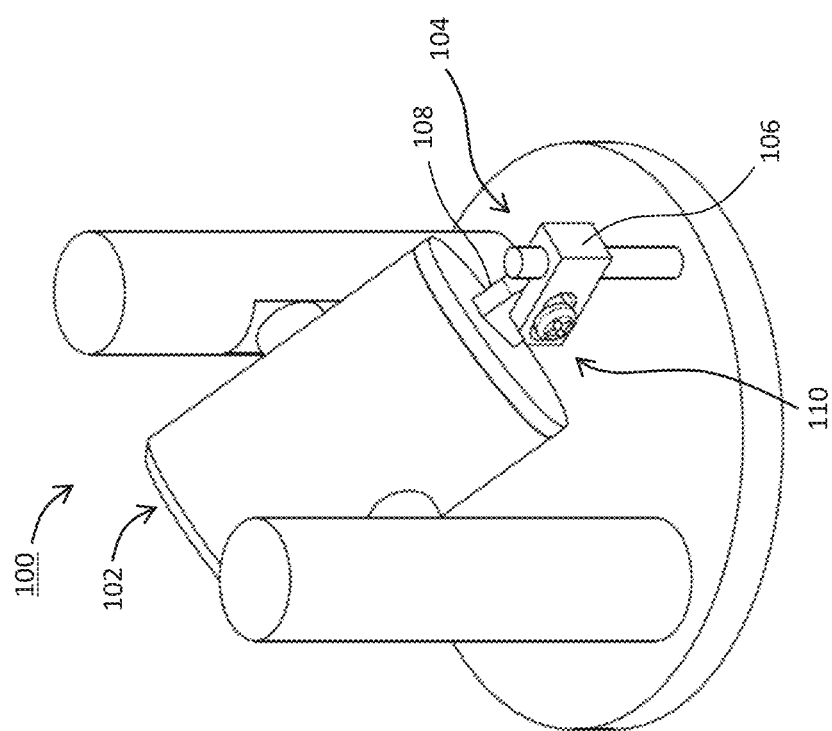
FIG. 7 is a perspective view showing a second example of the MAS apparatus.
Figure 8:
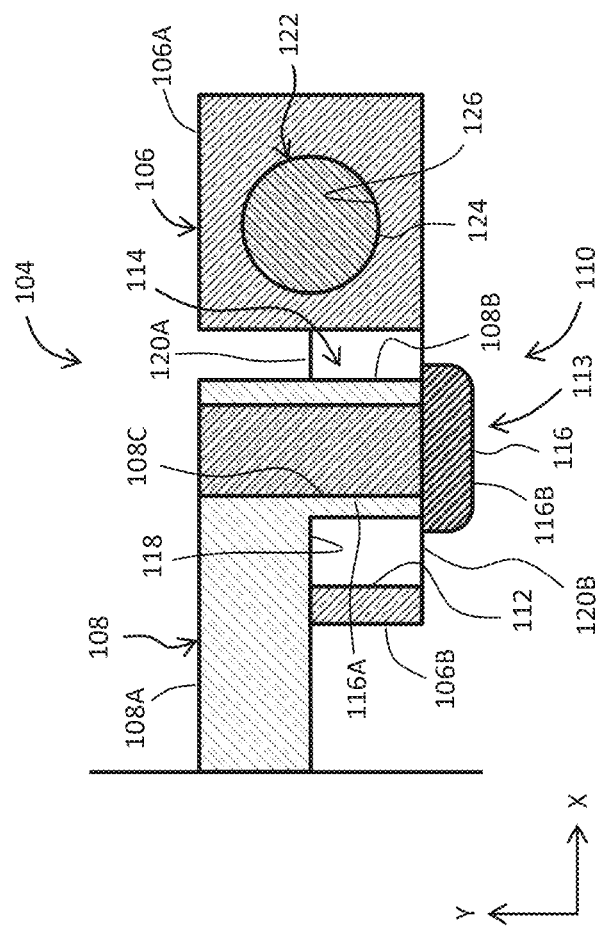
FIG. 8 is a cross-sectional view showing a second example of the angle adjustment mechanism.

FIGS. 7 and 8 show a second example of the MAS apparatus. A basic configuration of a MAS apparatus 100 shown in FIG. 7 is the same as that of the MAS apparatus in FIG. 2. The MAS apparatus 100 differs from the MAS apparatus in FIG. 2 in that it has a connection mechanism 110 in an angle adjustment mechanism 104. The connection mechanism 110 will be described in detail below.

The connection mechanism 110 is provided across a block 106 that is the first movable part and a projecting piece 108 that is the second movable part. The block 106 is caused to move vertically in a linear motion. The projecting piece 108 is fixed to a stator 102. The projecting piece 108 is a member that is caused to move in an arc motion around the tilt axis.

FIG. 8 shows a horizontal cross-section of the connection mechanism 110 in the angle adjustment mechanism 104. The block 106 is composed of a body 106A and a protruding portion 106B. The projecting piece 108 is composed of a body 108A and cylindrical portion 108B. In the body 106A, a female thread 126 that is a perpendicular through hole is formed. A rod end portion; that is, a male thread 124, is inserted in the female thread 126, and the two are engaged with each other. The protruding portion 106B has an elongated hole 112 formed therein. The long axis of the elongated hole 112 is parallel to the X direction.

A shaft member 113 penetrates through the inside of the elongated hole 112. The shaft member 113 is composed of the cylindrical portion 108B and a screw 116. The cylindrical portion 108B has a horizontal screw hole 108C, and the screw 116 is inserted in the horizontal screw hole 108C. The horizontal screw hole 108C and the screw 116 are engaged with each other. The screw 116 is composed of a body 116A inserted in the horizontal screw hole 108C, and a head portion 116B connected to an end portion of the body 116A. The diameter of the head portion 116B is greater than the size of the short axis of the elongated hole 112. As such, in the vertical direction, the head portion 116B is larger than the elongated hole 112.

As for the block 106, the body 106A and the protruding portion 106B are integrally formed, and as for the projecting piece 108, the body 108A and the cylindrical portion 108B are integrally formed. The block 106 and the projecting piece 108 are made of the same material. In other words, the portion where the elongated hole 112 is formed and the cylindrical portion 108B are made of the same material. By using the same material for the two portions, the degree of thermal contraction of the two portions can be equal during the cooling process, thereby maintaining the size of the short axis of the elongated hole 112 and the diameter of the cylindrical part 108B in a matched state.

The protruding portion 106B has a first side surface 120A directed to +Y direction and a second side surface 120B directed to −Y direction. The first side surface 120A is in contact with the body 108A of the projecting piece 108. The head portion 116B is hooked to the second side surface 120B. The clockwise motion of the block 106 (first horizontal rotational motion) is restricted by the projecting piece 108, and the counterclockwise motion of the block 106 (second horizontal rotational motion) is restricted by the head portion 116B.

The block 106 and the projecting piece 108 are coupled in the Y direction and the Z direction (the direction penetrating the page). On the other hand, in the x-direction, the block 106 and the projecting piece 108 are not fastened to each other; that is, there is a certain degree of freedom between them.

By adopting the above configuration, changes in the positional relationship between the block 106 and the projecting piece 108 are allowed in the X direction during the process of adjusting the tilt angle of the stator and during the cooling process. This prevents excessive stress on any particular parts. The tilt angle of the stator can thus be adjusted smoothly even when it is cooled.

Figure 9:
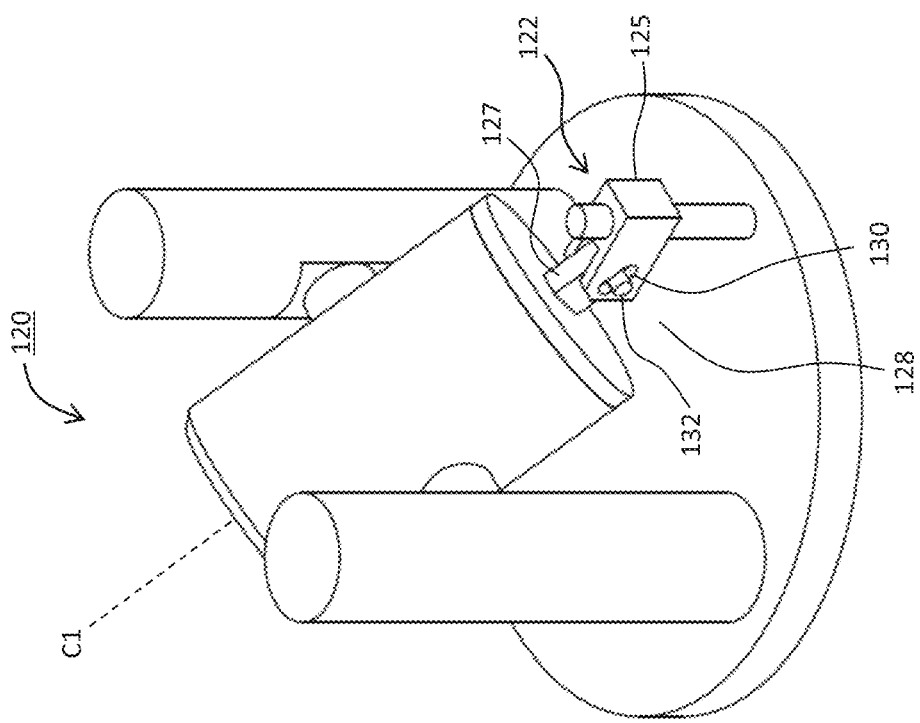
FIG. 9 is a view showing a first modification.
Figure 10:
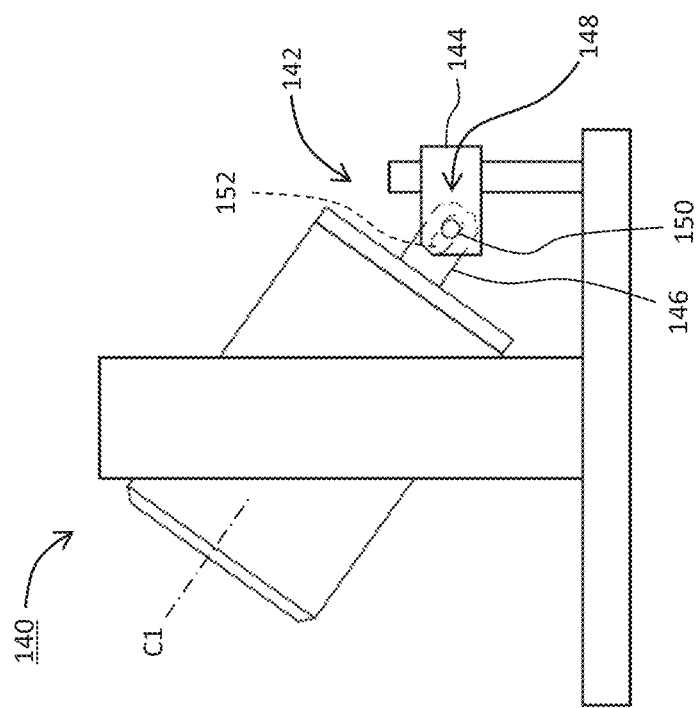
FIG. 10 is a view showing a second modification.
Figure 11:
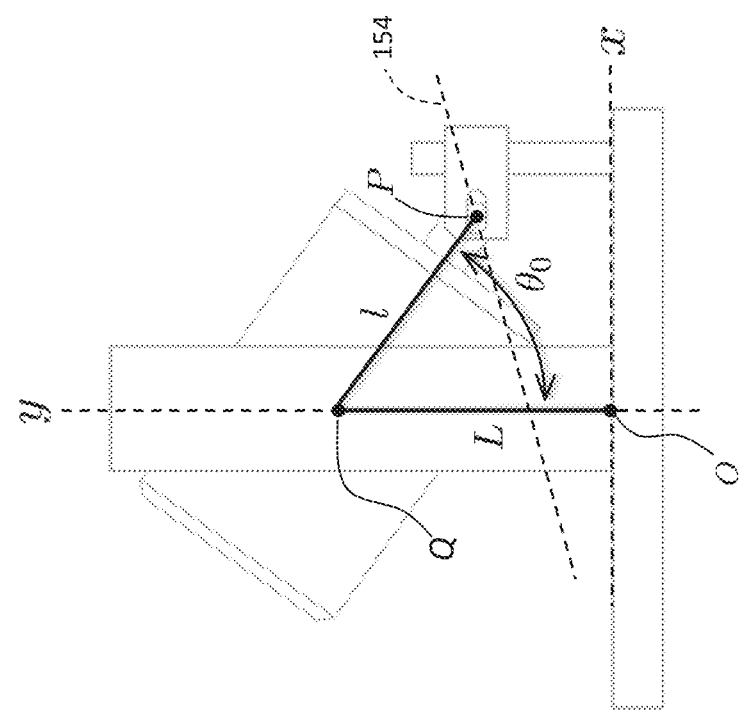
FIG. 11 is a view for illustrating a third modification.

FIGS. 9, 10, and 11 respectively show a first modification, a second modification, and a third modification of the MAS apparatus. Basic configurations of the modifications are the same as those of the MAS apparatuses shown in FIGS. 2 and 7. Connection mechanisms of the modifications differ from those of the MAS apparatuses shown in FIGS. 2 and 7.

In the first modification shown in FIG. 9, a MAS apparatus 120 has a tilt angle adjustment mechanism 122. The tilt angle adjustment mechanism 122 has a block 125 and a projecting piece 127. The block 125 has elongated holes 130 formed therein, and a shaft member 132 is fixed to the projecting piece 127. The shaft member 132 is inserted in the elongated holes 130. The elongated holes 130 and the shaft member 132 constitute a connection mechanism 128. The long axis of the elongated holes 130 is tilted, and its tilt angle is equal to the magic angle, for example. Other tilt angles may be adopted.

In the second modification shown in FIG. 10, a MAS apparatus 140 has a tilt angle adjustment mechanism 142. The tilt angle adjustment mechanism 142 has a block 144 and a projecting piece 146. A shaft member 150 is fixed to the block 144, and the projecting piece 146 has an elongated hole 152 formed therein. The shaft member 150 is inserted in the elongated hole 152. The shaft member 150 and the elongated hole 152 constitute a connection mechanism 148. The long axis of the elongated hole 152 coincides with the central axis of the stator.

The third modification will be described with reference to FIG. 11. In the coordinate system shown in FIG. 11, the x direction is the first horizontal direction, and the y direction is the vertical direction.

In the third modification, the tilt angle of the elongated hole is determined in consideration of thermal contraction of some main components in the MAS apparatus. In the illustrated example, thermal contraction of the posts and the stator during the cooling process is taken into account. O indicates the origin of the coordinate system, and Q indicates the tilt axis. P indicates the central axis of the shaft member in the projecting piece. The distance between the tilt axis Q and the central axis P of the shaft member (the length of a first portion of interest) is indicated by l, and the distance between the tilt axis Q and the origin O (the length of a second portion of interest) is indicated by L. The magic angle is indicated by $\theta_0$.

In the cooling process, the length l(t) of the first portion of interest after contraction is expressed by the following equation (1-1), and the length L(t) of the second portion of interest after contraction is expressed by the following equation (1-2).

$$l(t)=l_0(1+\alpha t) \qquad (1\text{-}1)$$

$$L(t)=L_0(1+\beta t) \qquad (1\text{-}2)$$

In the equations, $l_0$ indicates the length of the first portion of interest before contraction, and $L_0$ indicates the length of the second portion of interest before contraction. $\alpha$ indicates the coefficient of thermal expansion of the first portion of interest, and $\beta$ indicates the coefficient of thermal expansion of the second portion of interest. t indicates temperature.

Eliminating t included in the above equations (1-1) and (1-2) leads to the following equation (2):

$$y = \frac{L_0\beta - l_0\alpha \cos\theta_0}{\alpha l_0 \sin\theta_0}x + L_0\frac{\alpha - \beta}{\alpha} \qquad (2)$$

The tilt angle of the long axis of the elongated hole is determined according to the above equation (2). For example, if changes in the x and y coordinates due to change in t are represented by a line 154, the elongated hole is formed such that its long axis coincides with the line 154. If the line 154 is curved, the long axis of the elongated hole may be curved. By adopting the third modification, it is possible to reduce the amount of sliding of the shaft member during the angle adjustment process and the amount of sliding of the shaft member during the cooling process.

The above embodiments make it possible to provide the MAS apparatus that can properly perform angle adjustment even when it is cooled. In the above embodiments, the upper end portion of the stator may be connected to the angle adjustment mechanism. The upper end portion and the lower end portion of the stator may be connected to the angle adjustment mechanism located therebetween. By connecting the angle adjustment mechanism to the end portions of the stator, it is possible to increase the radius of the arc motion trajectory of the projecting piece, thereby achieving precise angle adjustment. By connecting the angle adjustment mechanism to the lower end portion of the stator, it is possible to reduce the distance over which the external operating force is transmitted. In the above embodiments, the two posts may have a beam between their upper end portions.

The invention claimed is:

1. A magic angle spinning (MAS) apparatus comprising:
    a stator configured to move a sample tube in a rotational motion,
    a structure configured to rotatably support the stator around a tilt axis parallel to the horizontal direction, and
    an angle adjustment mechanism configured to adjust the tilt angle of the stator, wherein
    the angle adjustment mechanism comprises
    a first movable part configured to move vertically in a linear motion by an external operating force,
    a second movable part configured to be fixed to the stator and configured to move in an arc motion around the tilt axis, and
    a connection mechanism that is provided across the first movable part and the second movable part,
    the connection mechanism comprises
    an elongated hole that is provided in one of the first movable part and the second movable part, and
    a shaft member that is provided in the other one of the first movable part and the second movable part and has a shape extending in the horizontal direction, the shaft member being inserted in the elongated hole,
    during a process of adjusting the tilt angle of the stator, the connection mechanism configured to convert the linear motion of the first movable part into the arc motion of the second movable part, and at this time, the shaft member is caused to move in a sliding motion against the elongated hole, and
    when a positional relationship between the elongated hole and the shaft member changes due to thermal contraction of the MAS apparatus during a process of cooling the MAS apparatus, the shaft member is caused to move in a sliding motion against the elongated hole.

2. The MAS apparatus according to claim 1, wherein
    the shaft member has a body inserted in the elongated hole,
    the size of the short axis of the elongated hole matches the diameter of the body, and
    the size of the long axis of the elongated hole defines the maximum sliding range of the shaft member.

3. The MAS apparatus according to claim 1, wherein
    the stator has an upper end portion and a lower end portion spaced apart in a direction of the central axis of the stator, and
    the second movable part protrudes from the lower end portion along the direction of the central axis.

4. The MAS apparatus according to claim 1, wherein
    the one of the movable parts has a first side surface and a second side surface,
    the other one of the movable parts contacts the first side surface, and
    the shaft member has a body that protrudes from the other one of the movable parts and is inserted in the elongated hole, and an enlarged end portion that is provided at a tip of the body and is hooked on the second side surface.

5. The MAS apparatus according to claim 4, wherein
    the body has a horizontal screw hole,
    a screw is inserted in the horizontal screw hole, and
    the enlarged end portion is a head portion of the screw.

6. The MAS apparatus according to claim 1, wherein
    the first movable part has a female thread that is a perpendicular through hole,
    the angle adjustment mechanism further comprises a rod configured to transmit the operating force and has a rod end portion having a male thread inserted in the female thread, and
    the first movable part and the rod end portion are made of the same material.

7. The MAS apparatus according to claim 1, wherein
    the structure comprises a pair of posts configured to rotatably support the stator around the tilt axis,
    the pair of posts comprises a pair of bearings configured to hold a pair of rotating shaft members fixed to the stator, and
    during the cooling process, the degree of thermal contraction of a material constituting the pair of bearings is greater than that of a material constituting the pair of rotating shaft members.

8. The MAS apparatus according to claim 7, wherein
    the pair of posts have a pair of first gas passages,
    the pair of rotating shaft members have a pair of second gas passages, and
    cooled gas is supplied to the inside of the stator through the pair of first gas passages and the pair of second gas passages.

* * * * *